Figure 1:
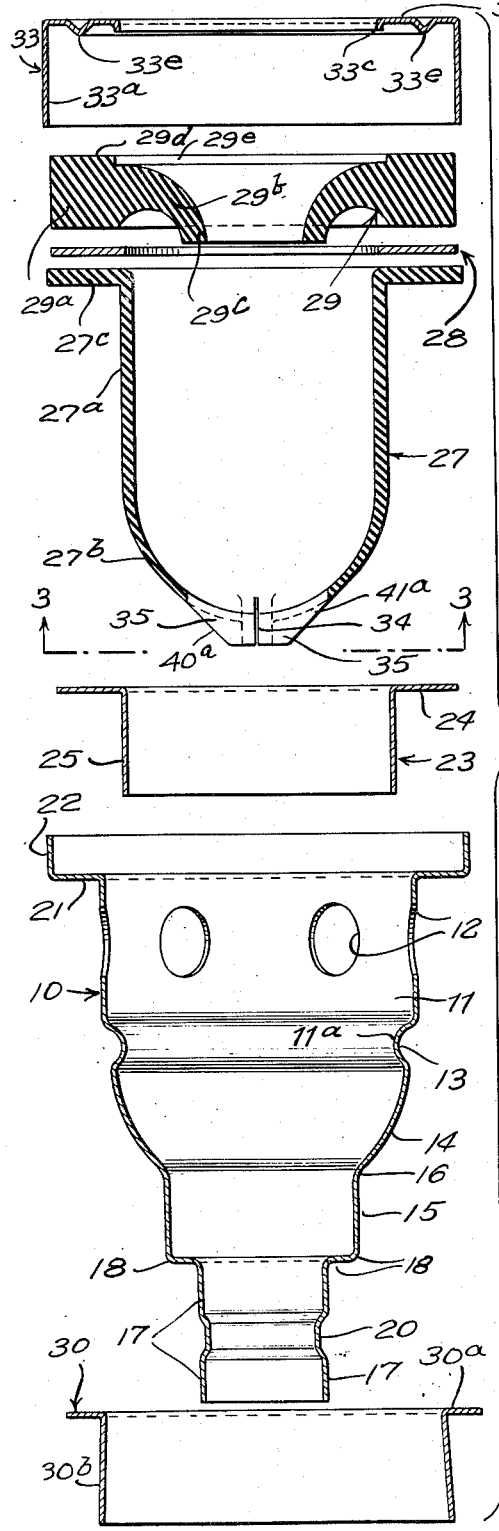

Oct. 10, 1950     O. J. BURKE     2,524,764

VALVE CONSTRUCTION

Filed April 12, 1944

INVENTOR
ORMONDE J. BURKE
BY William T. Wiesner
ATTORNEY

Patented Oct. 10, 1950

2,524,764

UNITED STATES PATENT OFFICE 2,524,764

VALVE CONSTRUCTION

Ormonde J. Burke, New York, N. Y.; Adrian P. Burke executrix of said Ormonde J. Burke, deceased Application April 12, 1944, Serial No. 530,605

9 Claims. (Cl. 137—69)

This invention relates to valve construction, more particularly of the type for use in hydraulic circuits in which exists risk of reverse flow under atmospheric pressure or by a syphonic action in case of failure of pressure in the supply side of the hydraulic circuit or system.

This application is a continuation in part of my application, Serial No. 506,957, filed October 20, 1943, which matured into Patent No. 2,347,988 on May 2, 1944.

One of the objects of this invention is to provide a valve construction of the above-mentioned nature in which the various parts are individually constructed so as to facilitate efficient and inexpensive manufacture thereof and so as to make possible simple, speedy and economical assembly of these parts to complete the valve construction as a unit. Another object is to provide, in a valve construction of the above-mentioned nature, a rubber valve element and coacting parts so constructed as to facilitate economical manufacture and simple and reliable assembly to insure intended coaction of the rubber valve element with other parts and to achieve also dependable protection for the rubber valve element. Another object is to provide a construction of the above-mentioned nature, but constructed and adapted for ready attachment to a faucet or the like. Another object is to provide a valve construction of the above-mentioned nature that will be compact, light yet strong and durable, and well adapted to meet the varying conditions of hard, practical use.

Another object is to provide a valve construction of the above-mentioned nature that will be capable of embodiment, in its metallic parts, out of sheet metal and thus gain the advantages of facility and economy of construction of its individual parts, and yet be capable of efficient, simple, inexpensive and long-lasting assembly. Another object is to provide a valve construction of the above-mentioned nature in which a valve seat or valve seats, with which a rubber valve element is to coact, may be dependably, economically and efficiently shaped or formed and, moreover, in a manner that will facilitate adaptation to various requirements. Another object is in general to provide an improved valve construction of the above-mentioned nature. Other objects will be in part obvious or in part pointed out hereinafter.

The invention accordingly consists in the features of construction, combinations of elements, and arrangements of parts, all as will be exemplified in the structure to be hereinafter described and the scope of the application of which will be indicated in the following claims.

Figure 2:
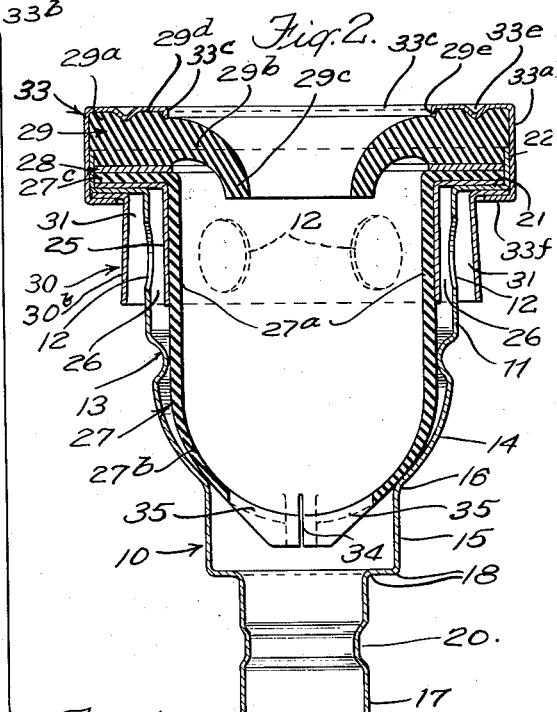
Figure 3:
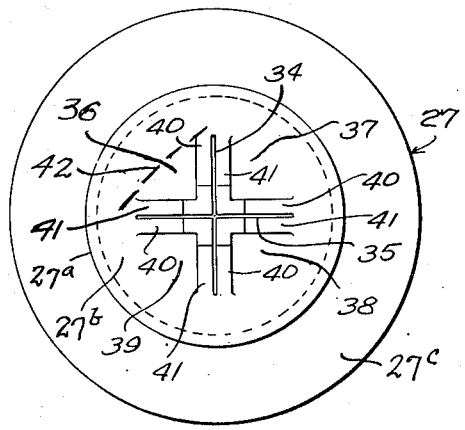

In the acompanying drawing in which is shown illustratively a preferred embodiment of my invention, Figure 1 is an exploded view showing the various parts of the valve construction, all in central vertical cross-section, in substantially the order in which they may be assembled;

Figure 2 is a central vertical sectional view showing the assembled valve construction; and Figure 3 is a bottom elevation of a rubber valve element as seen along the line 3—3 of Figure 1.

Similar reference characters refer to similar parts throughout the several views of the drawing.

In Figure 1 I have shown, separately, the preferred individual parts in their preferred individual forms to achieve speed and efficiency of assembly and also preferred functional features, all of which is set forth illustratively and not by way of limitation unless limited in the following claims; it will facilitate understanding of the structural and functional features if, what I shall hereinafter term a casing, is first described, and in Figure 1 that casing is indicated by the reference character 10. In the illustration, it is preferably made of sheet metal such as brass, aluminum or the like and may be, for example, stamped, drawn, spun or otherwise given the desired shape and certain preferred structural features for coacting with certain other parts. Thus the casing 10 is generally cylindrical in that its internal and external surfaces are surfaces of revolution, generated by lines, geometrically speaking, that are revolved about an axis which is to be the axis of the ultimate valve unit. Preferably also, the remaining parts, later described, are in the same sense cylinders.

The part 10 has, adjacent its upper end which will be termed the inlet end, a straight cylindrical portion 11 preferably of substantial axial extent, provided with suitable holes 12, which may be easily punched and which are to function as air inlet ports as later described. Portion 11 is of substantial length downwardly and in its lower end portion it is spun to provide an inwardly bulging annular rib 13 which preferably is to function as a valve seat and which also can materially strengthen the casing 10 by reason of its cross-section which may be, illustratively, arcuate. Below the inwardly pressed or spun portion 13, the casing 10 merges from the diameter of the cylindrical portion 12, inwardly at progressively diminishing diameter to provide a portion 14 which in the illustration is inwardly concave and which at its lower end merges into a straight cylindrical portion 15, thereby providing at the junction of the parts 14 and 15 another inwardly extending and annular reinforcing portion 16 which preferably functions also as a valve seat, as is later described.

The lower end of the straight portion 15 terminates in a smaller-diametered portion 17, the curvatures at 18 where the part 15 preferably abruptly merges into or joins with the part 17 also providing reinforcing and strengthening annular rib-like elements, thus to stiffen the casing 10.

The lower portion 17, being at the lower and what will hereinafter be called the outlet end of the casing 10, is constructed in any suitable or desired way to facilitate connection into the hydraulic circuit, and in the illustrative embodiment it is constructed in the form of a nipple, having suitable external annular grooving 20, formed as by spinning, therein, so that a rubber or like hose or tubing can be securely clamped to the nipple 17 and pressed into the grooving 20.

At the outlet end of the casing 10, the metal of the casing extends laterally from and about the upper end of the portion 11, forming a flange-like horizontal annular seat 21 and thence the metal extends upwardly from the latter in the form of an upstanding cylindrical portion 22. Where the casing 10 is made of sheet metal or other light or thin-walled materials, the annular angularities formed at the junctions between parts 11—21 and parts 21—22 further strengthen and reinforce the casing structure just as do the other above-mentioned reinforcements, and where the casing 10 is made of sheet metal, the portions 21 and 22 may be formed as by drawing, spinning or the like.

The annular seat 21 forms a seat for a horizontal flange-like portion 24 of a part generally indicated by the reference character 23; the external diameter of the flange 24 is just enough less than the internal diameter of the part 22 of casing 10 so as to neatly center the part 23 and position it coaxially with the casing 10, and thereby also position the downwardly extending straight cylindrical portion 25 thereof with respect to the straight portion 11 of the casing 10 and since the diameter of portion 25 is materially less than that of the casing portion 11 (see also Figure 2), the portion 25 is thus held equidistantly from the inside walls of the portion 11, thus forming between the two an annular space or channel 26 (Figure 2). The portion 25 is of downward extent to reach preferably just below the line of the lower edges of the air inlet ports 12 in the casing 10.

With the part 23 thus coaxially seated within the inlet end of the casing 10, the structure is ready to receive a multiple valve element generally indicated by the reference character 27 which is made of any suitable flexible or elastic means, such as rubber, and with the casing 10 shaped substantially as above described, the rubber valve element is preferably given a shape as shown in Figures 1 and 2, being throughout its major upper portion $27^a$ cylindrical and straight and preferably of substantially uniform thickness, and its lower portion $27^b$ being substantially hemispherical and preferably of progressively varying thickness as is later described. The diameter of the portion $27^a$ is such that it is snugly receivable within the portion 25 of the member 23 and the upper end terminates in a peripheral horizontal flange $27^c$ which is dimensioned to mate with and snugly rest upon the flange portion 24 of the member 23, the casing portion 22 and the portion 25 of member 23 coacting to position the rubber valve element 27, with nicety, coaxially within the casing 10 and the parts being so proportioned that, when so assembled, the hemispherical portion $27^b$ of the rubber valve element is just about in tangential contact with the valve seat 16, but preferably, for reasons later set forth, falling free and clear of such tangential contact by a small margin or clearance.

The peripheral horizontal flange $27^c$ of the rubber valve element 27 forms in turn a seat upon which other parts may rest. Thus it may support a connector element 29 which preferably and illustratively is made of rubber, but preferably where part 29 is yieldable, I interpose a rigid washer element 28. Connector element 29, in this embodiment, comprises a preferably heavy ring-shaped or annular outer portion $29^a$ having integrally formed therewith and extending inwardly and downwardly from the theoretical inner face of the portion $29^a$ an annular lip portion $29^b$ preferably of progressively diminishing cross-section and conveniently defined as shown in Figures 1 and 2, by two curved planes downwardly concave as seen in Figure 1, and the annular lip $29^b$ may thus terminate in a sleeve-like portion $29^c$ of suitable thickness and internal diameter and axial length.

Connecting element 29 is now seated upon the flange portion $27^c$ with washer 28 interposed, and is centered with respect to the casing 10 and to the rubber valve element 27 by the upstanding flange portion 22 whose internal diameter is substantially matched by the external diameter of the ring portion $29^a$ of part 29, for that purpose. The combined thickness of portions 24, $27^c$, 28 and $29^a$, when thus superimposed one upon the other and upon the seat 21, is preferably somewhat greater than the axial dimension or height of the cylindrical flange portion 22 above the seat portion 21, so that the relatively heavy ring portion $29^a$ of part 29 has its upper face $29^d$ resting in a plane above the plane of the upper edge of the casing portion 22, according to one mode of assembly later described, but as will later appear, this relationship may be varied according to various factors, such as the resiliency of the rubber employed and the shape of other coacting parts.

Preferably also, the lip portion $29^b$ does not merge into this upper face $29^d$ in order, preferably, to provide an internal annular shoulder $29^e$ which I may cause to coact with certain other parts later described.

The assembly having proceeded thus far, a member generally indicated by the reference character 30 is next assembled externally of the casing 10 and brought to rest, with its horizontal flange-like portion $30^a$, against the under horizontal face of the horizontal lateral extension 21 which thus provides also a seat on its underface and whose maximum diameter is substantially matched by the outside diameter of the portion $30^a$. The part 30 has a downward sleeve-like extension $30^b$ which is of materially larger inside diameter than the outside diameter of the straight portion 11 of the casing 10, thus not to close off the air ports 12 in the latter, and is of an axial length to reach substantially below the lower edges of the air ports 12, thereby forming a protective external apron about the air ports to guard against tampering with the air ports. The annular space 31 between the portion 30ᵇ and the casing portion 11 is, however, open at its lower end (see Figure 2) thus to permit free flow of air to the air ports.

Next I provide a combined securing device and complementary casing part, in the form of an annular member generally indicated by the reference character 33. Like the parts 23 and 30, it may be made of sheet metal and thus easily stamped, drawn or spun, and it comprises an external straight cylindrical portion 33ᵃ of a diameter to telescope over the casing end portion 22 and of a length materially greater than the length of casing portion 22 itself; it has a horizontal inwardly extending annular portion 33ᵇ of a radial dimension appropriately to overlie the upper annular face 29ᵈ of the part 29, and it is to coact with the casing portion 21 to clamp the portions 24, 27ᶜ, 28, and 29ᵃ securely between itself and the portion 21.

Preferably, the portion 33ᵇ is also conformed to grip a suitable portion of the part 29 to resist strains or stresses imposed upon or by the part 29 that would tend to shift the portion 29ᵈ radially inwardly. For example, I may provide the portion 33ᵇ, at its inner annular end with a downwardly extending flange portion 33ᶜ that takes into or against the shoulder 29ᵉ and which may embed itself somewhat if desired into the thicker portion of the lip 29ᵇ, which is resilient, underlying or forming part of the shoulder 29ᵉ. The shoulder 29ᵉ thus forms an annular inside face for the ring portion 29ᵃ against which this annular flange 33ᶜ rests and engages to resist such inward movement as above noted.

Or, I may provide in the portion 33ᵇ, a downwardly directed V-shaped annular rib 33ᵉ which, as is also shown in Figure 2, can embed itself into the face 29ᵈ of the resilient portion 29ᵃ, and thus also achieve better holding action against inward movement. Illustratively, I may employ both of these actions and corresponding structural arrangements which also strengthen and reinforce the portion 33ᵇ which, when the part 33 is fastened to the casing part 10, in effect forms a casing part complemental to the casing 10.

With the parts 30, 10, 23, 27, 28, 29 and 33 thus put together, thus interfitted one to the other and all in relation to the casing parts 21 and 22, and such interfitting is a simple manual operation, the complementary casing and securing part 33 is, by any suitable jig or fixture, further telescoped axially onto the casing part 22, thus to bring the lower peripheral end of flange portion 33ᵃ of the part 33 well below the underface of the portion 30ᵃ of part 30 which becomes coaxially aligned or centered with respect to the remaining parts by the telescoping flange portion 33ᵃ within which the portion 30ᵃ is snugly received, and it is during this operation that the superimposed rubber portions 27ᶜ and 29ᵃ are subjected to the desired amount of compression which may be substantial, depending upon the characteristics of the rubber and other factors, such as the desired extent of gripping of the part 29 by such portions as 33ᵉ or 33ᶜ or 33ᵇ itself, and while thus held under compression, the part 33 and the casing 10 are secured together against separation. This is preferably achieved by turning or spinning the lower end of the telescoping flange portion 33ᵃ, which for that purpose is dimensioned to project beyond the part 30ᵃ when the rubber elements are so compressed, inwardly and against the underface of the horizontal flange portion 30ᵃ of the part 30. This inwardly bent securing portion of the telescoping flange 33ᵃ is shown in Figure 2 at 33ᶠ.

By this assemblage also, the junction between the parts is made leakproof, the compressed rubber portions 29ᵃ and 27ᶜ functioning dependably as gasket-like sealing means, and being, in the final valve unit, still under compression, the resultant follow-up action of the compressed rubber part or parts insures maintenance of mechanical assemblage and of sealing. As the rubber parts are compressed and the assemblage completed, the compression of the horizontal flange portion 27ᶜ of the rubber valve element 27 may have the effect of bodily lowering the valve element 27 itself, to some extent, within the casing 10 and it is for that reason that allowance, in the proportioning of the various parts, is preferably made, as by providing substantial clearance between the valve seat 16 and the upper part of the hemispherical portion 27ᵇ upon initial putting together of the parts, as above noted. It is preferred that, in the final valve unit, the portions of the valve member below the internal sleeve part 25 are suspended, in the absence of hydraulic flow through the unit, so as to be free of contact with the walls of the casing 10 and to just clear the annular valve seat 16, in order to avoid adhesion or self-vulcanization of the rubber to the casing.

If made of sheet metal, the parts 30, 23 and 33 will be seen to be also easy and inexpensive to manufacture, and simple punch press operations may be employed for that purpose. Moreover, the shapes of the various parts include structural features which, aside from coacting in the assemblage or in the functioning of the unit are also strengthening or reinforcing in action, and when secured together as above described they also coact to provide substantial strength and rigidity even though they may be made of light materials. The complemental and securing part 33 coacts with the parts 30, 10 and 23 at strengthening angularities thereof to give a maximum of strength to the valve unit particularly at the upper portion thereof as seen in Figure 2 where it is most likely to be gripped in making a connection to a pipe, spigot or faucet or the like, and to facilitate such gripping the outer face of the telescoping flange 33ᵃ may be knurled or roughened.

This increased strength in this portion of the unit is of advantage when the valve unit is connected to a faucet, pipe or the like, usually by an operation of turning it, as in threading, to compress the inwardly extending sleeve 29ᶜ and lip 29ᵇ between the pipe or faucet end and the uppermost cylindrical portion of the rubber valve element 27 adjacent its horizontal flange 27ᶜ, and such turning is resorted to when the pipe end or faucet end is threaded, the resiliency of the rubber of the portions 29ᶜ and 29ᵇ of the connecting element accommodating itself to the threads. The resiliency of this upper end portion of the valve member 27 may thus also contribute toward making a leakproof connection to the hydraulic system in that it resiliently backs up the sleeve and lip portions 29ᶜ and 29ᵇ as the latter are expanded and pressed outwardly (Figure 2) thereagainst, the rubber part or parts in turn being backed up during these actions by the internal member 23 whose cross-sectional or angular shape gives it good strength for this purpose, being itself reinforced and strengthened against these actions by the casing portions 21—22, by the member 25, and by the member 33. Safety and ease of handling and dependability of connection of the valve unit may thus be insured, particularly where the valve unit, with a hose (not shown) attached to its outlet end is employed in connection with various household appliances.

The lower end portion 27$^b$ of the rubber valve element is illustratively constructed as shown in the drawing and as is described and claimed in my above-mentioned co-pending application. The lower end portion 27$^b$ is as above noted substantially hemispherical and the portion 14 of the casing 10 which is of diminishing diameter and which may be curved and hence have a radius of curvature to make it internally concave is of a radius of curvature preferably larger than the radius of curvature of the rubber valve portion 27$^b$ to provide for an annular passageway between the two parts (see Figure 2) that becomes progressively narrower, being narrowest in the region of the valve seat 16.

Preferably also, the thickness of the rubber in the lower curved portion 27$^b$ progressively diminishes substantially as indicated in the drawing, from the normal thickness of the upper portion 27$^a$ to a thickness at or about the bottom midpoint that is, for example, about one-third of the thickness of the portion 27$^a$. This construction is preferred where it is desired to give a progressive variability of action of the rubber valve member under internal pressure.

The lower portion 27$^b$ is provided with suitable self-closing slits which, illustratively and preferably, comprise two slits 34 and 35 (see Figure 3) intersecting each other and extending at right angles, thus forming four sector-shaped flaps 36, 37, 38 and 39. These slits may be molded during the manufacture of the rubber valve element and in such case are preferably as narrow as is practicable for molding, and of course they may be formed in any other suitable way. Preferably, each sector-shaped flap is provided with reinforcing ribs 40 and 41 which merge or join at the apex of the sector and which preferably taper off as at 40$^a$ and 41$^a$ to merge at their outer ends into the hemispherical or outwardly convex surface of the portion 27$^b$.

The contacting faces of adjacent ribs form in effect extensions of the faces of the rubber parts that define the slits and when in face to face contact (in the drawing the width of the slits is exaggerated) and particularly when wet they can form a tight seal or closure.

The tapering of the ribs has the effect of giving each flap a definite hinge-like connection in that each flap can hinge or swing downwardly as viewed in Figures 1 and 2 about an axis that may be represented by substantially a chord or straight line connecting the ends of the slits that bound each flap; in Figure 3 one such chord is indicated by the broken line 42. These lines of hinging, as seen in Figure 2, fall within that circle or annular area in which, during the action of the device the rubber valve element contacts the shoulder or valve seat 16, and the latter can act as an annular support or backing, or virtually like a fulcrum, about which the flexing of the flaps into open position can take place.

In normal or at rest position, as above noted, there is a small annular space between the lower portion 27$^b$ of the valve element and the convex shoulder or seat 16, but when flow is started as above described, the static head or velocity head, or both, achieves a downward elongation of the rubber member 27 or expands the lower hemispherical portion even though the flap elements are opened for flow; either or both of these actions may be present as desired; preferably, I utilize both. Both are facilitated and the action creating them made more sensitive to pressure by reason of the changing thickness of the rubber element in its transition from the upper cylindrical portion to the region of the midpoint or axis of its lower hemispherical portion, thus insuring lesser resistance to change in configuration under the internal pressure and thus bringing about an immediate or quick peripheral seating against the convex seat 16. That seating closes off access of air from the atmosphere into the path of flow of the liquid so that the flowing liquid does not act as a suction pump, and it also closes off access of flowing liquid to the annular passage that leads to the ports or apertures 12 so that leakage of liquid from the system does not take place.

It will be understood that, if desired, the assemblage of the parts may be such that, normally or in the at rest position of the parts, a peripheral portion of the portion 27$^b$ engages and is substantially tangent to the convex portion 16; in such case, the above-described actions still take place, but effect a tighter seating and in both cases the area of mutual seating contact, for sealing, can be of substantial extent due to the self-accommodation of the rubber element to the internal curvatures of the lower casing portion.

As the internal pressure increases, the suspended portion of the rubber valve element 27 is increased in radius, the action being a progressive one from about the region of the convexity 16 in an upward direction, the rubber walls of valve member 27 being progressively more and more laid against the concave surface 14, thus increasing the initial sealing or closing above described, and then engaging the valve seat or rib 13 to effect thereby another sealing or closing. Continued increase in pressure can effect outward bulging of that annular part of the cylindrical portion 27$^a$ that is suspended between the lower end of the part 25 and the rib 13, bringing it tightly up against the cylindrical portion of surface 11$^a$. Usually, during normal flow of liquid through the system, the pressure may be insufficient to achieve this last-mentioned seating of a portion of the rubber valve member 27 against the cylindrical portion of surface 11$^a$, but should the flow be stopped as by a shut-off in that part of the system connected to the outlet side 17 of the valve structure, the static head can and does effect seating of the rubber element, not only against the rib 13, but also against the cylindrical portion of surface 11$^a$, thus insuring against escape of liquid from the system by way of the apertures 12.

The system is thus maintained leakproof during normal operation, that is, during normal flow of liquid through the valve structure, when velocity head is principally effective to maintain a seal against the surfaces 16 and 14, aided, according to circumstances, by static head to effect a still further seating against the rib-like seat 13, and upon shut-off or blocking on the outlet side of the valve structure, the resulting built-up static head follows up with certainty of seating against the rib-like seat 13 and also of the side walls of the portion 27$^a$ against the cylindrical portion of wall surface 11$^a$. Furthermore, the structure can function to avoid water hammer effects as when the liquid is quickly or suddenly shut off in that part of the system connected to the outlet side of the valve structure; in such case, the pressure is rapidly and in some cases suddenly built up to substantial values due to the corresponding reduction to zero of the velocity factor of the flow and in such case the built-up or increased pressure is dissipated in increasing the radial dimensions of the cylindrical portion 27ª of the rubber valve element 27, bulging it outwardly against the casing wall 11ª. The internal volume of the chamber or space within the member 27 is thus increased, aiding in avoiding water hammer effects in a manner suggestive of the action of a stand pipe or surge tank. The tightness of seal that follows from these actions is increased and thus greater insurance against leakage of liquid through the apertures 12 is achieved. These actions also take place in varying degrees when, for example, instead of quickly shutting off the flow, a back pressure is progressively built up as the flow is progressively diminished as when a valve or nozzle or the like is gradually brought to shut-off position.

In any case, dependable assurance against leakage or escape of liquid out of the apertures 12 is achieved in that the seal effected by the portion 27ᵇ of the rubber valve element 27 against the surface 16 or the surface 14, or both, effected, one might say, primarily by velocity head, can be and is supplemented by sealing action of the portion 27ª against the rib 13 and sealing action against the cylindrical portion of surface 11ª, these actions preferably taking place successively as will now be understood.

Should conditions arise where, for example, the pressure head on the inlet side of the valve structure is lost so that a syphoning action takes place to reverse the flow of the liquid in the system and hence cause the outlet 17 to become an inlet and the upper inlet end of the valve construction to become the outlet, the structure operates quickly and dependably to stop such reverse flow, which, in a household water system, could be contaminating, by bringing about the quick admission of air from the atmosphere, thus to break the liquid stream in the system at the valve structure by a column of air admitted at the valve structure into the system.

When such a condition arises, the initial cessation of flow in the proper direction removes the velocity head that operates upon the sector-shaped flaps 36, 37, 38 and 39, and which during normal flow holds them open, whence, due to the elastic character of the material of the valve element 27, swing or hinge into closing position, bringing the relatively large faces of the ribs 40 and 41 into engagement and closing the slits. Any tendency of flow in reverse direction operates to tend to swing these flap elements more tightly together, thus physically dividing the column of liquid in the system.

The outlet end of the valve element 27 is thus tightly closed, and the tightness is increased by the suction effect caused by the reversely moving syphon column of liquid in that part of the system that is connected to the upper or inlet end of the valve structure.

These actions operate to diminish the radius of the lower hemispherical portion 27ᵇ of the rubber valve element 27, drawing its walls inwardly and upwardly and hence away from seating and sealing contact with the wall portion 14 or 16, or both; the loss of pressure or velocity head having previously permitted the freely suspended portion 27ª to contract under its elasticity or resiliency away from seat or rib 13 and wall seat 11ª. The system is thus quickly exposed to the atmosphere by way of the air ports 12 and the above-mentioned uncovered seats from which the above-mentioned actions have effected withdrawal of the portions of the rubber element 27, the progressively diminishing thickness of the hemispherical lower portion 27ᵇ thereof facilitating inward flexing thereof or a shortening up of the radius thereof to unseat the rubber element at the portions 16 or 14, or both. The construction will thus be seen to be such that, though during normal operation sealing is first effected at the seat 16 followed successively by increased seating, as at 14, and then at the rib seat 13 and, if necessary, also at the cylindrical portion of surface 11ª, each succeeding seat requiring, in the preferred embodiment and as appears from Figures 1 and 2, a greater range of outward distention of the member 27, abnormal conditions that bring about syphoning action or a vacuum effect are invariably such as to quickly effect unseating at whatever seats the rubber element 27 happens at the moment to be seated against; in this latter connection, the unseating may, according to circumstances, take place successively, as, for example, an unseating first at the cylindrical portion of surface 11ª and at 13 when the pressure head initially drops sufficiently, followed by prompt unseating in the region of seat 16 when vacuum or syphoning conditions are initiated.

In any case, quick unseating is reliably effected and the resultant ingress of air permits instantaneous drop of the liquid, by gravity, in the region below the seat 16, thus preventing transfer of liquid in that part of the system connected to the outlet side of the valve to that part of the system connected to the normal inlet side of the valve structure.

Once the unseating is achieved to admit air from the atmosphere to the space about and external of the rubber valve element 27, the pressure of the atmosphere presses inwardly upon the suspended portion of the member 40, tending further to compress it in a direction to reduce its radius or radii, insuring maintenance of unseated relationship of the rubber element 27 with respect to the various seats, and air may be admitted through the slits 34 and 35 to the interior of the rubber element 27 and hence to that side of the system in which the syphonic action or below-atmospheric pressure is being created; thus "breaking" the "vacuum" and halting the syphoning action can be effected. Ingress of air through the lower valve elements or flaps of the member 27 can take place slowly or rapidly, according to circumstances. Ordinarily, ingress of air, as permitted by the effective orifice areas of the slits, will take place at a sufficient rate to prevent syphoning of the liquid on the outlet side of the valve.

Restoration of flow or of pressure head of liquid in the direction from the inlet side of the valve toward the outlet side closes off the ingress of air to the system and the functioning of the structure can again proceed as earlier above described.

In the foregoing description, I have referred to the member 27 and also member 29 as being of rubber, but by the term "rubber" as used herein I do not intend to be restricted to the use of natural rubber, but include therein any other material, including synthetic rubbers, that have appropriate characteristics of flexibility, stretchability and recovery, or elasticity, to serve the purposes above described.

The device will thus be seen to function dependably under widely varying conditions of practical use, and particularly where, at the outlet side of the system, variable or substantial back pressures are brought into being. For example, let it be assumed that a hose is attached to the nipple end 17 and that the hose in turn has attached to it a suitable yieldable or rubber cup-like member that can be manually fitted over a sink, drain or the like and pressed or held in sealing relation, with the valve unit attached, at its inlet end, to the sink faucet, so that accumulations in the trap underneath the drain and which tend to clog the drain can be forced through and out of the trap to restore initial freedom of flow through the drain pipe. In such action, the conditions of operation are unusually severe and variable in that, for example, when the faucet is opened to start forcing through the clogging material in the trap, there may initially be little, if any, velocity head and as the water under pressure starts moving the clogging material, subsequent flow of water can be extremely variable and hence also the back pressure, for the slug of clogging material might shift in position or volume in the trap and thus vary the egress of water therethrough and correspondingly vary the back pressure. During such actions, leakage of water through the air ports 12 should be prevented and the actions of the rubber valve element in relation to its various seats can insure minimum risk of such leakage. If any leakage were by chance to take place, the external apron portion 30$^b$ of the member 30, which can be flared downwardly and outwardly if desired, as shown in the drawing, acts as a baffle and dependably guides any such possible leakage downwardly and hence into the sink. During such an illustrative use of the valve unit of my invention, the substantial back pressure and substantial variations in back pressure, being a minimum when the trap is cleared and free flow of water therethrough takes place, imposes upon the connecting element 29 a correspondingly varying strain or load to resist the reaction of the back pressures from disengaging the valve unit from the faucet. Where the faucet end is threaded, the interfitting or interengagement of the threads with the resilient or yieldable rubber portions 29$^b$ and 29$^c$ materially aid in maintaining the connection whereas, if the faucet is not threaded, the portions 29$^b$ and 29$^c$, backed up by the rigidly held and compressed ring portion 29$^a$ tightly and elastically grips the faucet end throughout a substantial axial length of area thereof, since the sleeve portion 29$^c$ may be made of any suitable length and it as well as the lip portion 29$^b$ become tightly laid against the faucet portion 29$^b$ become tightly laid against the faucet throughout a substantial area. Security of connection is furthermore enhanced in that these portions are well backed up by the multiple interfitting reinforcing metal parts that are related to them, including part 28, and that peripherally surround and envelop them at the upper end of the valve unit.

The washer member 28 is of advantage in these connections and also in the assembly, and according to desire or circumstances, it may be constructed to have any desired yieldability or rigidity, preferably the latter. Thus it may be made of rubber that is still yieldable but less so than the parts 29$^a$ and 27$^c$ between which it is interposed; in such case, it lessens undesired distortion at the adjacent faces of these two parts under the axial compression thereof, and yet can yield to any desired extent, including radially, under the reaction of gripping by the rubber parts 29$^b$ and 29$^c$ of the faucet, pipe, or the like. Where greater rigidity is desired, the washer member 28 can be made of a material like hard rubber or like fibre, and for still greater rigidity it can be made of metal.

Depending upon the material employed, its internal periphery may be of any suitable diameter in relation to its related parts, such as to the internal diameter of the portion 27$^a$ of the rubber sleeve element. Thus, when made of relatively rigid material, such as metal, it is preferred that its internal periphery be of a diameter more or less matching the diameter of the part 25, so as not to present internally exposed edges which might injure or cut into adjacent outwardly pressed portions of the rubber connecting element 29. If more or less yieldable as when made of rubber of less yieldability than the other rubber parts, the diameter of its internal periphery can be larger and the member can then yieldably back up outwardly distended portions of the rubber connecting element 29. In any case, however, it facilitates achieving nicety of junction under compression between the rubber parts 29$^a$ and 27$^c$, particularly where the axial dimension of one or more of the parts, such as the portion 29$^a$, is substantial and hence when there is a relatively large mass or masses of rubber to be axially compressed.

It will thus be seen that there has been provided in this invention a valve construction in which the various objects above set forth together with many thoroughly practical advantages are successfully achieved.

The individual parts will be seen to be easily and inexpensively fabricated, particularly when made of sheet metal, and in sheet metal form lend themselves to ease and facility of change or variation to meet various requirements. For example, the internal shoulder or valve seat 16 or the valve seat 13, and for that matter the wall portions 14 against which the rubber valve element may be seated, may easily be given, during the spinning operation, any desired change in expanse or shape as may be desired according to the characteristics of the rubber valve element itself or according to the action desired.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. A valve construction comprising a casing of circular cross-section having an outlet at its lower end and having its upper end conformed to provide a lateral flange terminating in an upstanding peripheral flange and provided with air ports below said lateral flange, a cylindrical apron of larger diameter than the casing extending about the latter and overlying said air ports and having a lateral flange seating against said casing lateral flange, a sleeve member of lesser diameter than the casing extending inwardly of the latter and overlying in spaced relation said air ports internally and having a lateral flange seated against said casing lateral flange and centered by said upstanding casing flange, a rubber sleeve-like valve element extending through said sleeve member toward the outlet end of the casing, said casing having valve seat means against which said valve element is seated by internal pressure and said sleeve member holding said valve element against being pressed against or into said air ports, said rubber valve element having a lateral flange overlying the flange of said sleeve member, a rubber-connecting element having a ring-like portion overlying the flange of said rubber valve element, and means telescopically related to said casing peripheral flange and having a flange underlying said apron flange for clamping together the flange of said apron, said lateral casing flange, said lateral valve flange, and said ring-like portion of said connecting element, with the rubber of said valve flange and the rubber of said ring-like portion under compression.

2. A valve construction comprising a casing of circular cross-section having an outlet at its lower end and having its upper end conformed to provide a lateral flange terminating in an upstanding peripheral flange and provided with air ports below said lateral flange, a cylindrical apron of larger diameter than the casing extending about the latter and overlying said air ports and having a lateral flange seating against said casing lateral flange, a sleeve member of lesser diameter than the casing extending inwardly of the latter and overlying in spaced relation said air ports internally and having a lateral flange seated against said casing lateral flange and centered by said upstanding casing flange, a rubber sleeve-like valve element extending through said sleeve member toward the outlet end of the casing, said casing having valve seat means against which said valve element is seated by internal pressure and said sleeve member holding said valve element against being pressed against or into said air ports, said rubber valve element having a lateral flange overlying the flange of said sleeve member, a rubber-connecting element having a ring-like portion overlying the flange of said rubber valve element, and a sheet metal securing member having a cylindrical portion telescopically related to said casing peripheral flange and having at its upper and lower ends inwardly extending flanges respectively overlying said ring-like portion and underlying the lateral flange of said apron for clamping the parts together with the rubber of said valve flange and of said ring-like portion under compression.

3. A valve construction comprising a casing of circular cross section having an upper portion with an inlet end surrounded by laterally extending flange means and having a lower portion that is of progressively less diameter and thereby merges into and terminates in an outlet of lesser diameter than said inlet end, said casing having air port means below said flange means, a sleeve-like apron of larger diameter than said casing and extending externally thereabout and overlying in spaced relation said air port means, said apron having means seating it against the underside of said flange means, a sleeve-like member of lesser diameter than said casing and extending inwardly thereof and internally overlying said air port means, said sleeve-like member having laterally extending flange means seated against the upper side of said casing flange means, a rubber sleeve-like valve element of lesser diameter than the diameter of said casing and extending through said sleeve-like member and toward said outlet of said lower casing portion, a portion of said rubber element that extends beyond said sleeve-like member being of progressively less diameter and internally juxtaposed to said lower casing portion and terminating in a discharge end that projects into said outlet of said casing portion for coaction therewith under internal pressure, said sleeve-like member preventing internal pressure from expanding said valve member into or against said air port means and said casing having valve seat means below said sleeve-like member and against which internal pressure seats said rubber valve element, the latter having laterally extending flange-like means overlying said flange means of said sleeve-like member for coaction therewith to position coaxially said progressively lesser-diameter portion of the rubber element relative to said progressively lesser-diameter portion of the casing and to position coaxially said discharge end relative to said outlet, a connecting element for connecting the inlet end of said casing into a hydraulic system and having a ring-like securing portion overlying the flange means of said rubber valve element, and a securing means coaxially clamping together said apron-seating means, said casing flange means, said flange means of said sleeve-like member, said flange means of said rubber valve element, and said ring-like portion of said connecting means.

4. A valve construction as claimed in claim 3 in which said ring-like portion is of rubber and has interposed between it and the flange means of said rubber valve element a substantially rigid washer-like element to make more uniform the compression of said rubber valve flange and said ring-like portion under the clamping effect of said securing means and thereby to counteract tendency to dislocate the coaxial relationship of said clamped parts.

5. A valve construction comprising a casing of circular cross section having an inlet end and an outlet end that is of smaller diameter than said inlet end with casing wall portions of different diameters to substantially merge them into said smaller-diameter outlet end, said casing having air port means intermediate its two ends and a rubber valve element responsive to internal pressure to cut off or permit passage of air through said air port means and having a lower end portion extending into said outlet end and an intermediate portion of different diameter juxtaposed to said casing wall portions, for coaction therewith under internal pressure, said casing having a rubber-connecting element at its inlet end, said rubber-connecting element having a ring-like main body portion and an expansible mouth portion, and said casing having adjacent its inlet end a flange-like part, said rubber valve element having flange means overlying said casing flange part and underlying said ring-like portion for coaxially interrelating said part, and a securing element having a peripheral portion encompassing said ring-like portion and said casing flange part and having inwardly directed annular flange means, one of which underlies said casing flange part and the other of which overlies said ring-like portion for clamping them and said rubber flange means in assembled relation with the rubber of the ring-like portion and of said rubber flange means under compression, the flange means of said securing element engaging said ring-like portion and the latter having interengaging parts to resist in a radially inward direction dislodging of the rubber connecting element under radially inward strains imposed by the expansible connecting portion thereof.

6. A valve construction comprising a casing having an inlet end and an outlet end with air port means intermediate its ends and having a rubber valve element inwardly spaced from said air port means and responsive to internal pressure to cut off or permit passage of air through said air port means, a rubber connecting element having an internal connecting-lip portion directed inwardly of said rubber valve element and having a ring-like main body portion with means clamping said ring-like portion to the casing at the inlet end thereof, and a sleeve member extending internally of said casing and externally of said rubber valve element throughout the region in which said lip portion is directed inwardly of said rubber valve element to back up the latter against material distortion upon distention of said lip portion by a member engaged within the latter, said sleeve member having means clamped by said clamping means for holding it in position and against lateral shifting under internal forces.

7. A valve construction as claimed in claim 6 in which said rubber valve element has a lateral flange underlying said ring portion and clamped in position by said clamping means, whereby said ring portion and said valve flange may together back up said connecting-lip portion upon distension of the latter.

8. A valve construction comprising a casing of circular cross-section having an inlet at its upper end and an outlet at its lower end, said casing having a lateral flange adjacent its upper end and air port means below said flange, a rubber valve element extending downwardly into said casing for coaction with the latter under internal pressure to control passage of air through said air port means and having a lateral flange overlying said casing flange to thereby suspend said rubber valve element within said casing, a flanged sleeve-like apron element extending externally about said casing and overlying in spaced relation said air port means, and sheet metal means having a part underlying and adapted to hold the flange of said apron-like element seated against the underside of said casing flange and a part overlying said lateral flange of the rubber valve element and coacting with its last-mentioned part for exerting compression upon said lateral flange of the rubber valve element in a downward direction toward the upper face of said casing flange.

9. A valve construction comprising a casing of circular cross-section having an inlet at its upper end and an outlet of smaller diameter at its lower end, said casing having a lateral flange adjacent its upper end and air port means below said flange, a rubber valve element extending downwardly into said casing for coaction with the latter under internal pressure to control passage of air through said air port means and having a lower discharge end portion of progressively reduced diameter projecting into said smaller-diameter casing outlet, said rubber valve element having a lateral flange overlying said casing flange to thereby suspend said rubber valve element within said casing and to coaxially position its smaller lower end relative to said casing outlet for coaction therewith under internal pressure, cylindrical securing means enveloping said lateral casing flange having means abutting against the underside of said casing flange and extending downwardly about and spaced outwardly from said casing and the air port means therein and having sheet metal clamping flange means forcibly conformed into clamping relation under conditions of compression of said lateral flange of said rubber valve element in a direction downwardly toward the upper face of said casing flange whereby said rubber valve lateral flange remains under compression and by its resiliency coacts to maintain the clamping action of said clamping flange means.

ORMONDE J. BURKE.

REFERENCES CITED

The following references are of record in the file of this patent:

UNITED STATES PATENTS

| Number | Name | Date |
| --- | --- | --- |
| 1,605,577 | Bruen | Nov. 2, 1926 |
| 2,047,294 | Cekal | July 7, 1937 |
| 2,084,294 | Cooper | June 15, 1937 |
| 2,217,027 | O'Brien | Oct. 8, 1940 |
| 2,328,382 | Langdon | Aug. 31, 1943 |
| 2,347,988 | Burke | May 2, 1944 |

FOREIGN PATENTS

| Number | Country | Date |
| --- | --- | --- |
| 621,565 | Germany | Nov. 9, 1935 |